US010648399B2

(12) United States Patent
Barczak et al.

(10) Patent No.: US 10,648,399 B2
(45) Date of Patent: May 12, 2020

(54) EXHAUST-TUNING PORT AND TIMING AND COMBUSTION CHAMBER SHAPE

(71) Applicant: POLARIS INDUSTRIES INC., Medina, MN (US)

(72) Inventors: James A Barczak, Osceola, WI (US); Lawrence J. Hosaluk, Roseau, MN (US); Dallas J. Blake, Roseau, MN (US); Darren J. Hedlund, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 108 days.

(21) Appl. No.: 15/723,846

(22) Filed: Oct. 3, 2017

(65) Prior Publication Data

US 2019/0101050 A1    Apr. 4, 2019

(51) Int. Cl.
| F02B 25/20 | (2006.01) |
| F02B 75/02 | (2006.01) |
| F02B 25/14 | (2006.01) |
| F02B 27/04 | (2006.01) |
| F02B 33/04 | (2006.01) |
| F02F 1/24  | (2006.01) |
| F02F 1/22  | (2006.01) |

(52) U.S. Cl.
CPC .............. *F02B 25/20* (2013.01); *F02B 25/14* (2013.01); *F02B 27/04* (2013.01); *F02B 33/04* (2013.01); *F02B 75/02* (2013.01); *F02B 2075/025* (2013.01); *F02F 1/22* (2013.01); *F02F 1/242* (2013.01)

(58) Field of Classification Search
CPC .......... F02B 25/20; F02B 25/14; F02B 75/02; F02B 2075/025; F02F 1/242
See application file for complete search history.

(56) References Cited

U.S. PATENT DOCUMENTS

| 4,364,346 | A | * | 12/1982 | Shiohara | F01L 5/02 123/323 |
| 4,714,056 | A | * | 12/1987 | Tottori | F02B 27/06 123/65 EM |
| 5,662,074 | A | * | 9/1997 | Nagano | F02D 13/0284 123/65 PE |
| 6,244,227 | B1 | * | 6/2001 | Matte | F01L 1/38 123/65 PE |
| 7,484,482 | B1 | * | 2/2009 | Mayringer | F02B 25/20 123/65 PE |
| 8,578,895 | B2 | * | 11/2013 | Baldini | F02B 23/101 123/65 B |
| 9,556,832 | B1 | * | 1/2017 | Sergin | F02M 31/145 |

* cited by examiner

*Primary Examiner* — Syed O Hasan
(74) *Attorney, Agent, or Firm* — Harness Dickey (57) ABSTRACT

A two cycle engine having a block defining an exhaust port and a cylinder, a head, and a piston defining a combustion chamber is disclosed. The exhaust port has a resonant frequency that causes a portion of the combusted and uncombusted exhaust gasses to flow from the exhaust system and back into the combustion chamber. At a speed above the predetermined speed, a majority of the portion of the combusted and uncombusted exhaust gasses flows from the exhaust system and back into the combustion chamber without engaging the skirt of the piston.

20 Claims, 11 Drawing Sheets

EXHAUST-TUNING PORT AND TIMING AND COMBUSTION CHAMBER SHAPE

FIELD

The present disclosure relates to a vehicle engine and, more particularly, to a two cycle engine having improved air/fuel/exhaust mixture management.

BACKGROUND

This section provides background information related to the present disclosure which is not necessarily prior art.

Vehicles such as snowmobiles utilize two stroke engines which are run at high RPM. These two stroke engines produce a significant amount of heat which builds up in engine components reducing component life expectancy. Traditionally, this heat needs to be removed from the engine using fluid cooling systems that circulate cooling fluid through the engine block and head of the engine to remove heat. Unfortunately, at high RPM, resonances in the engine's exhaust system causes heated exhaust gas, which often contains unburned fuel, to impinge on the sides and skirt of the piston.

Further, inherent in the nature of the fuel to air mixtures for two cycle engines, it is often not possible to entirely burn all of the fuel in a combustion cycle. Often this unburned fuel arises from imperfect fluid dynamics with a cylinder. Eventually, upon exhaustion of the combustion gasses, this unburned fuel is sent into the exhaust system which may be lead to secondary combustion or emissions problems. Further, piston down stroke, gasses from the exhaust port are often pulled back into the combustion chamber to help mix new fuel and air as well as enhance the fuel to air concentration by augmenting the new fuel with unburned fuel from a previous engine cycle.

There is a need to improve exhaust and fuel mixing within a two cycle engine to reduce emissions, heat problems, and improve engine longevity. It is therefore an intention of the present teachings to improve engine performance with these goals in mind.

SUMMARY

This section provides a general summary of the disclosure, and is not a comprehensive disclosure of its full scope or all of its features. The present disclosure provides an improved system and method for reliably managing engine heat and fuel and air mixtures within a combustion chamber.

According to the present teachings, a two cycle engine for a vehicle is disclosed. The engine has a block defining an exhaust port and a cylinder, a head, and a piston defining a combustion chamber. The engine is configured to run at variable speeds that are determined by the rate at which fuel is being added to the combustion chamber. The exhaust port has a resonant frequency that, when not timed with the engine speed, causes a portion of the combusted and uncombusted exhaust gasses to flow from the exhaust system back into the combustion chamber. At a plurality of engine speeds below a predetermined engine speed, a majority of a portion of the combusted and uncombusted exhaust gasses flow from the exhaust system and impinge on the piston skirt before flowing back into the combustion chamber. At a speed above the predetermined speed, a majority of the portion of the combusted and uncombusted exhaust gasses flows from the exhaust system and back into the combustion chamber without engaging the skirt of the piston.

According to the afore mentioned paragraph and the following paragraphs, the exhaust port includes an exhaust valve which selectively changes an aperture size of the exhaust port depending on the engine speed.

According to the afore paragraphs and the following paragraphs, the exhaust port has a resonant frequency that depends on the position of the exhaust valve.

According to the afore paragraphs and the following paragraphs, the exhaust port is an elongated passage fluidly coupled to the combustion chamber. The elongated fluid passage being angled and having a flow direction away from the engine head.

According to the afore paragraphs and the following paragraphs, the head of the engine has a surface representing a portion of a cutaway of a horn torus that defines a portion of the combustion chamber.

According to the afore paragraphs and the following paragraphs, the head of the engine has a surface representing a portion of a cutaway of a torus which defines a portion of the combustion chamber and the engine further has a sparkplug which positions a spark initiating member centrally within the torus.

According to the afore paragraphs and the following paragraphs, the head of the engine has a surface representing a cutaway portion of a torus which defines a volume of greater than about 9% percent of the combustion chamber volume when the piston is at top dead center.

According to the present teachings, and the previous and following paragraphs, presented is an engine having an engine block, cylinder wall, piston having a skirt, and head defining a combustion chamber. Defined within the cylinder wall is an exhaust port having resonant frequency that causes a portion of combusted and uncombusted exhaust gasses to flow from the exhaust system and back into the combustion chamber. At a plurality of engine speeds a majority of a portion of the combusted and uncombusted exhaust gasses flows from the exhaust system and back into the combustion chamber after impinging on to the piston skirt. At a speed above the predetermined speed, a majority of the portion of the combusted and uncombusted exhaust gasses flows from the exhaust system and back into the combustion chamber without significantly engaging the skirt of the piston.

According to the present teachings, and the previous and following paragraphs, presented is an engine having an exhaust port defining an elongated channel, flow from said combustion chamber into the exhaust port flows at an angle obtuse to a centerline of the piston travel and away from the cylinder head.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate vehicle, such as, all-terrain vehicles, utility vehicles, moped and scooters. The examples disclosed below are not intended to be exhaustive or to limit the disclosure to the precise forms disclosed in the following detailed description. Rather, the examples are chosen and described so that others skilled in the art nay utilize their teachings.

Figure 1:
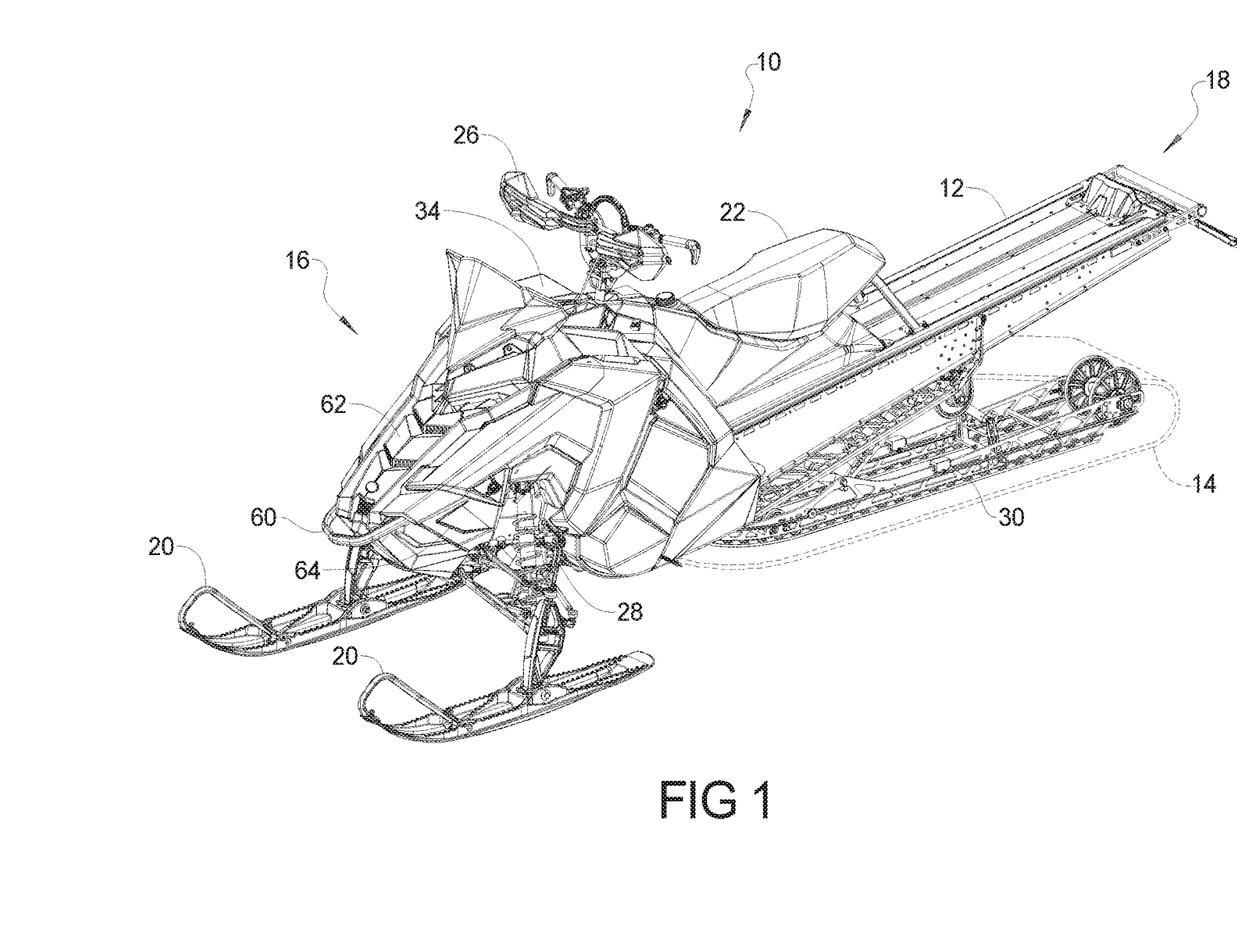
FIG. 1 is a perspective view of a snowmobile.
Figure 2A:
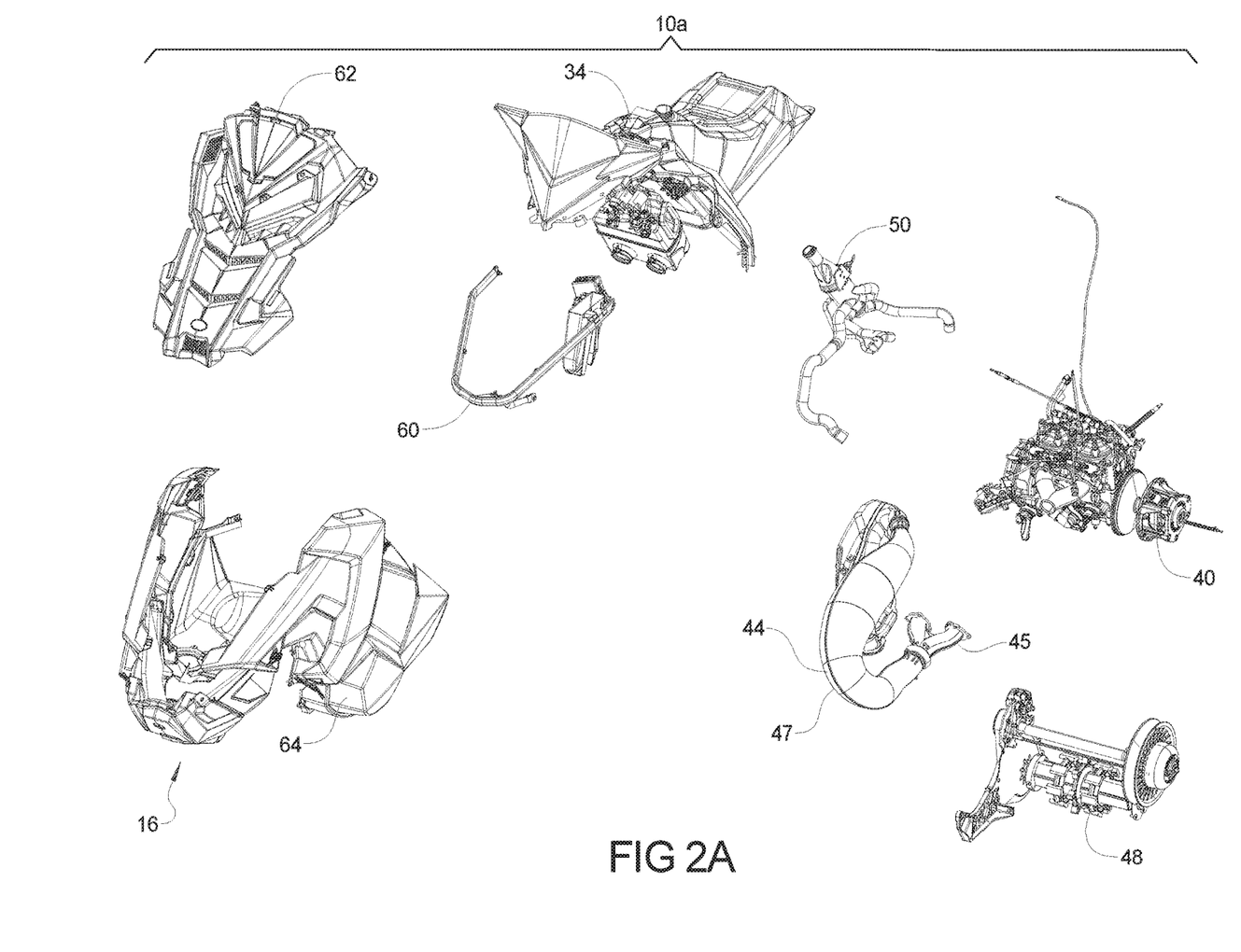
FIGS. 2A and 2B are exploded views of the snowmobile of FIG. 1.
Figure 2B:
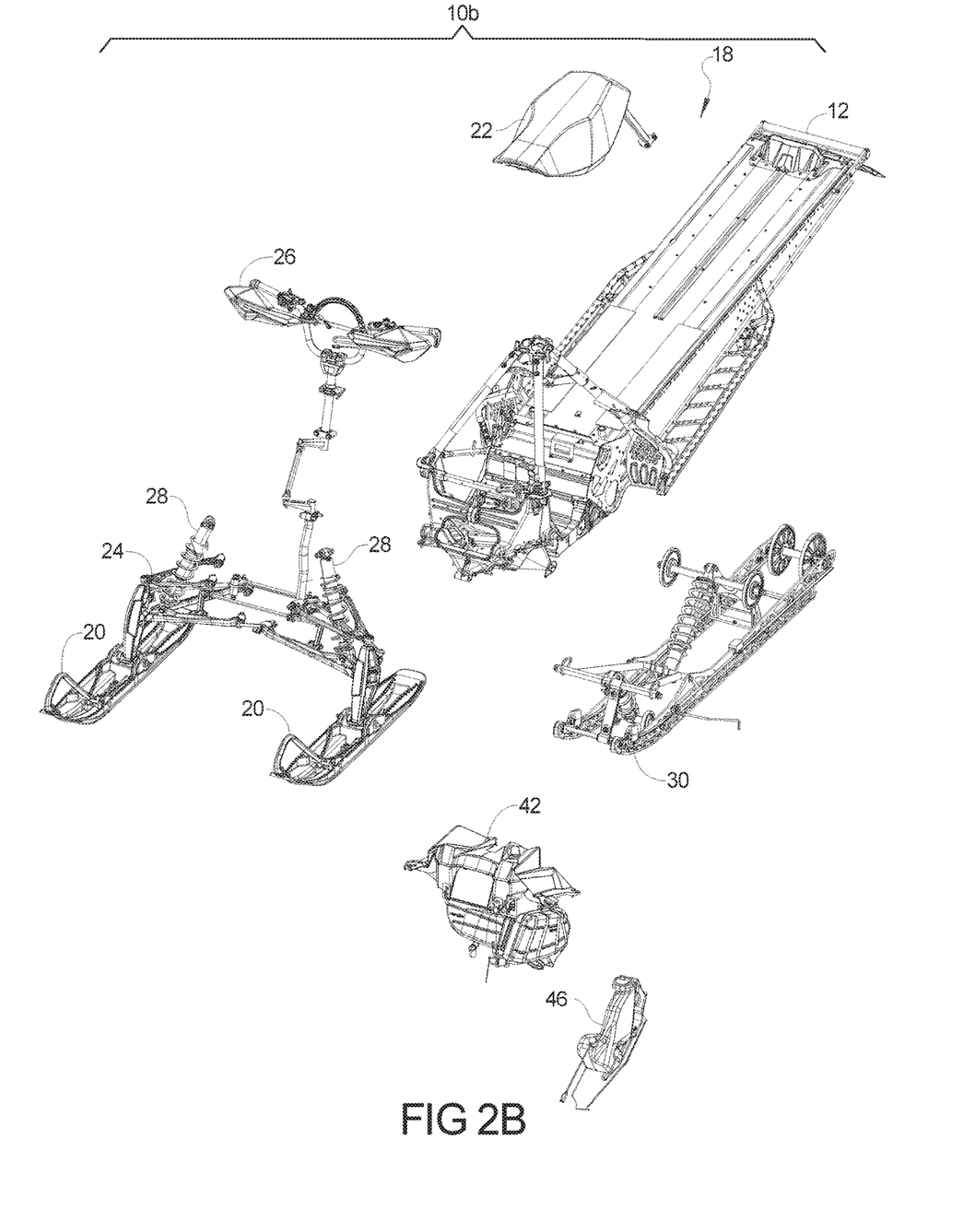

Referring now to FIGS. 1-2B, one embodiment of an exemplary snowmobile 10 is shown. Snowmobile 10 includes a chassis 12, an endless belt assembly 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include a steering wheel 26, shock absorbers 28 and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. An oil tank assembly 46 is used for providing oil to the engine for lubrication and for mixing with the fuel in the intake assembly 42. A drivetrain assembly 48 is used for converting the rotating crankshaft assembly from the engine assembly 40 into a force to use the endless belt 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3A:
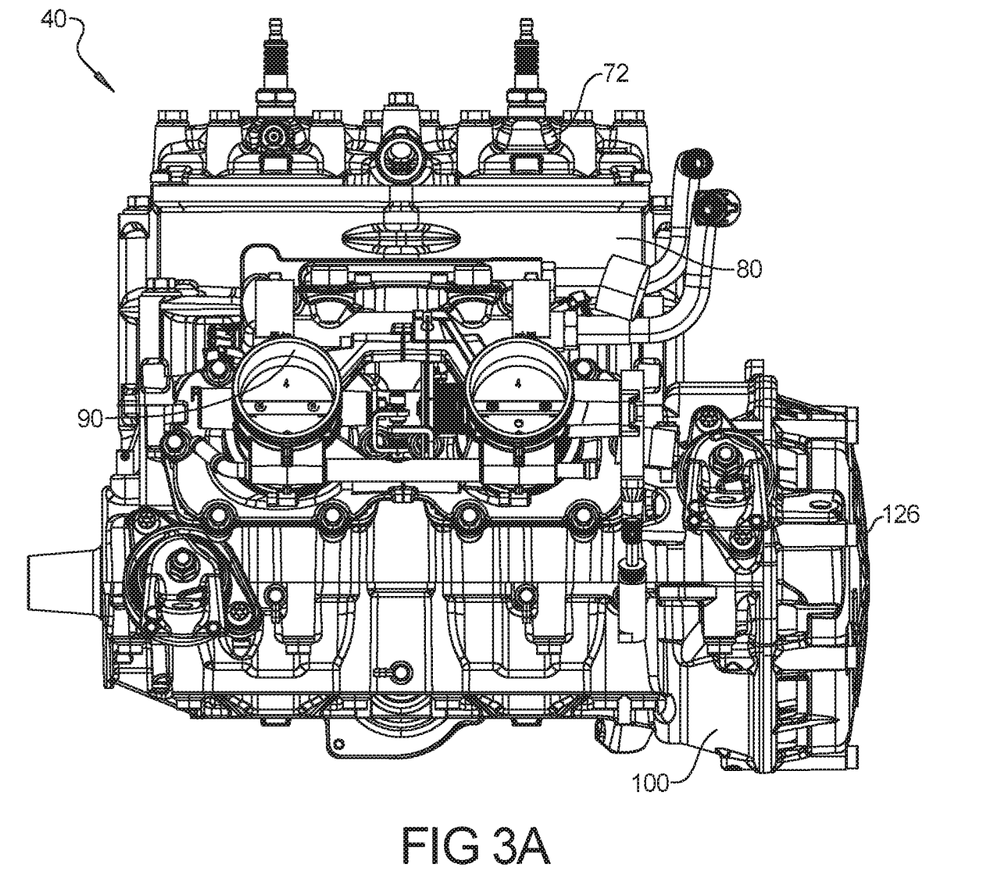
FIGS. 3A and 3B are opposite side views of the engine of FIG. 2.
Figure 3B:
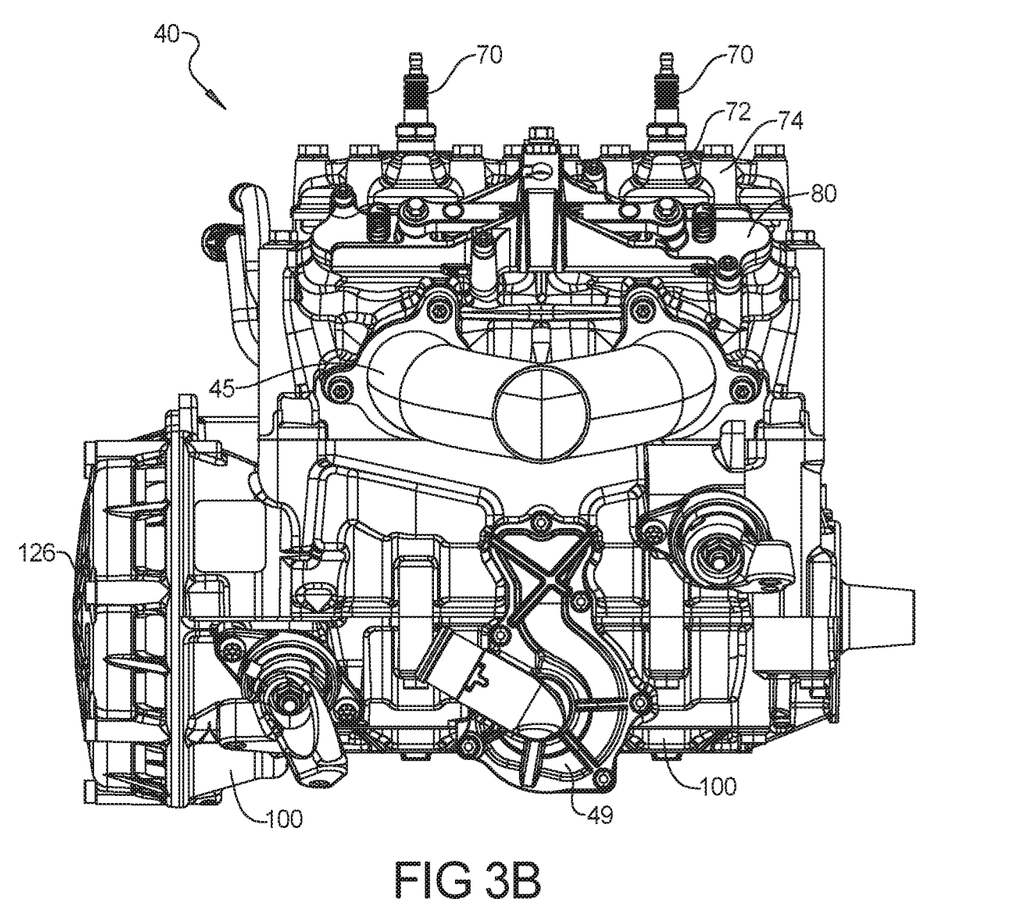
Figure 4:
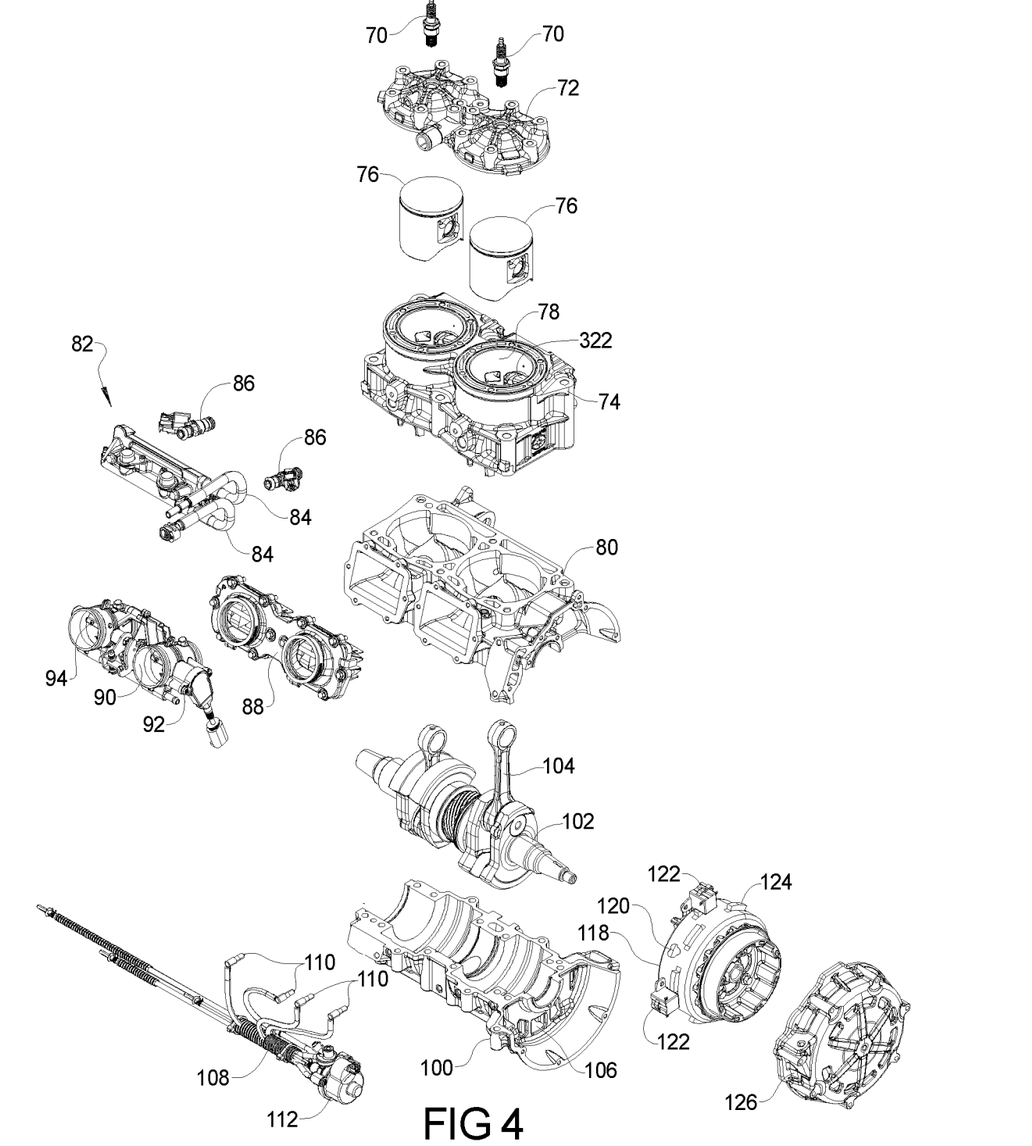
FIG. 4 is an exploded view of the engine of FIG. 3.

Referring now to FIGS. 3A, 3B and 4, the engine assembly 40 is illustrated in further detail. The engine assembly 40 is a two-stroke engine that includes the exhaust assembly 44 which may be referred to as an exhaust manifold.

The engine assembly 40 may include spark plugs 70 which are coupled to a cylinder head cover 72. The cylinder head cover 72 is coupled to the cylinder head 74 which is used for housing the pistons 76 to form a combustion chamber 78 therein. The cylinder head 74 is mounted to the engine block 80.

The fuel system 82 includes fuel lines 84 and fuel injectors 86. The fuel lines 84 provide fuel to the fuel injectors 86 which inject fuel, in this case, into a port adjacent to the pistons 76. An intake manifold 88 is coupled to the engine block 80. The intake manifold 88 is in fluidic communication with the throttle body 90. Air is air for the combustion processes admitted into the engine through the throttle body 90 which may be controlled directly through the use of an accelerator pedal or hand operated switch. A throttle position sensor 92 is coupled to the throttle to provide a throttle position signal corresponding to the position of a throttle valve of throttle plate 94 to an engine controller.

The engine block 80 is coupled to crankcase 100 and forms a cavity for housing the crankshaft 102. The crankshaft 102 has connecting rods 104 which are ultimately coupled to the pistons 76. The movement of the pistons 76 within the engine chamber 78 causes a rotational movement at the crankshaft 102 by way of the connecting rods 104. The crankcase may have openings or vents 106 therethrough. The system is lubricated using oil lines 108 which are coupled to the oil injectors 110 and an oil pump 112.

The crankshaft 102 is coupled to the flywheel 118 and having a stator 120 therein. The flywheel 118 has crankshaft position sensors 122 that aid in determining the positioning of the crankshaft 102. The crankshaft position sensors 122 are aligned with the teeth 124 and are used when starting the engine as well as being used to time the operation of the injection of fuel during the combustion process. A stator cover 126 covers the stator 120 and flywheel 118.

FIGS. 5-10 represent cross sectional views of the engine assembly 40 which are shown at various times of an engine piston rotation. The engine assembly 40 has a block 300, such as block 80 defining an exhaust port 310 and a cylinder 312 defining the combustion chamber 324, the engine head 74, and the piston 76. The engine assembly 40 is configured to run at variable speeds which changes as a fuel/air mixture is being added to the combustion chamber 324. The exhaust port 310 has a resonant frequency that causes a portion of the combusted and uncombusted exhaust gasses to flow from the exhaust assembly 44 back into the combustion chamber 324. At a plurality of engine speeds below a predetermined engine speed (about 6500), a majority of a portion and preferably more that 30% of the combusted and uncombusted exhaust gasses flow from the exhaust port 310 impinges on the piston skirt 315 prior to returning to the combustion chamber 324 with the remainder greater than 70% flowing past the skirt into the combustion chamber. Preferably, at max torque and power output RPM of the engine, more than 70% of the returned exhaust gas from the exhaust port will bypass the piston skirt. At a speed above the predetermined speed (RPM), a majority of the portion of the combusted and uncombusted exhaust gasses flowing from the exhaust port 310 and back into the combustion chamber 324 occurs without substantially engaging the skirt 315 of the piston 76. The exhaust port 310 includes an exhaust valve 320 which moves within the exhaust port 310 to change the cross sectional area and shape of an aperture 322 in response to changing engine conditions such as engine speed.

The exhaust port 310 is an elongated passage 325 fluidly coupled to the combustion chamber 324 and to the exhaust assembly 44. The elongated passage 325 is angled down at an obtuse angle, such as at between 100 degrees and 130 degrees, including at more than 100 degrees with respect to the piston centerline, and is configured to direct hot exhaust gasses in a direction away from the engine head 74.

Figures 5, 6:
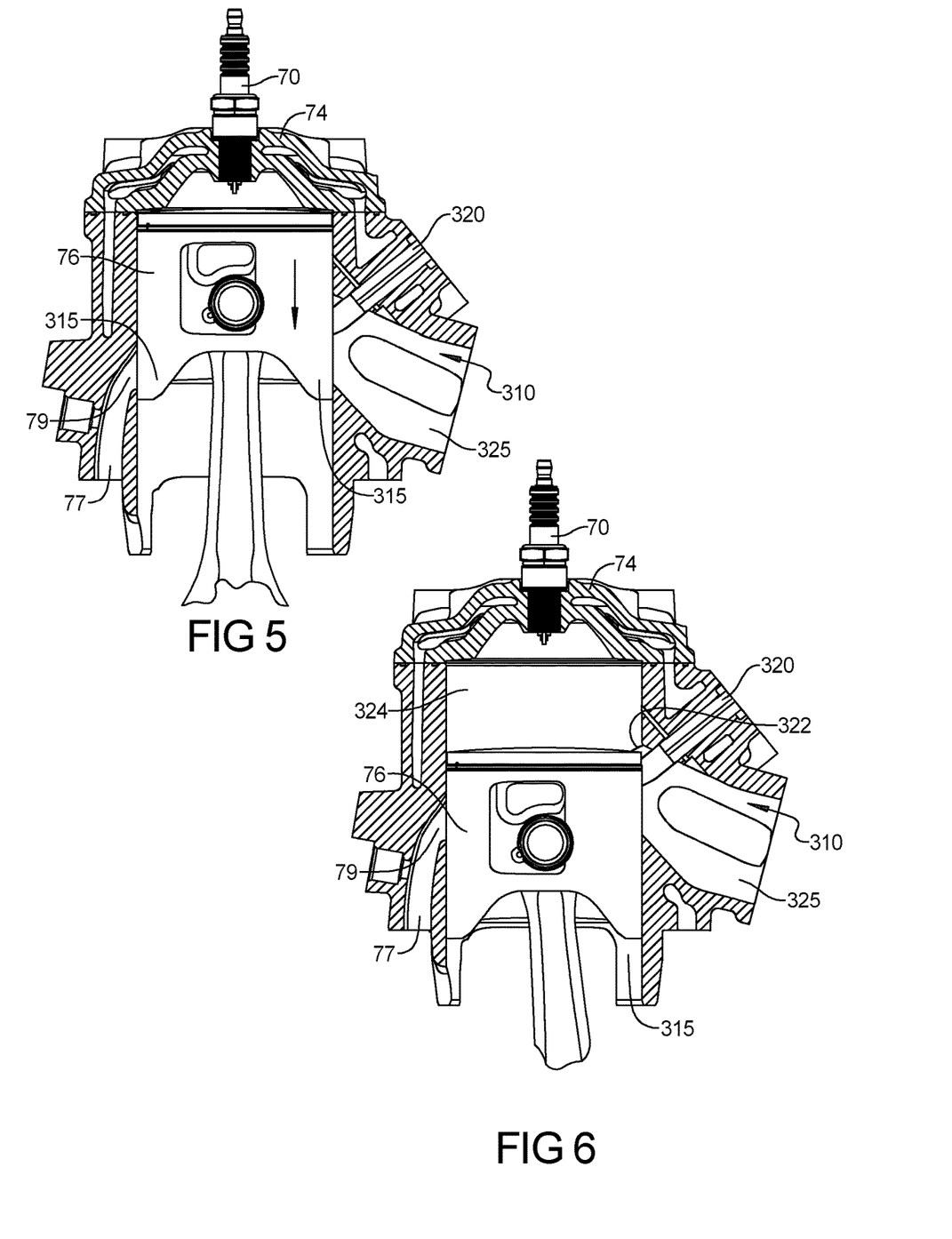
FIGS. 5-10 represent cross sectional views of the Engine shown in figure at various times of the engine rotation.
Figure 7:
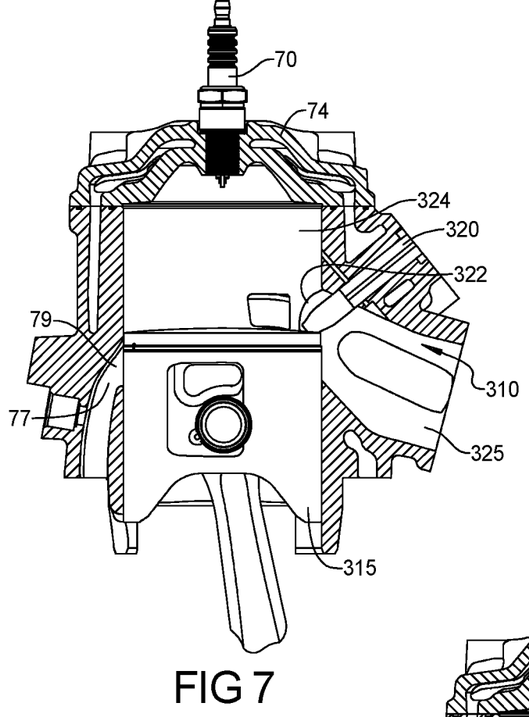
Figure 8:
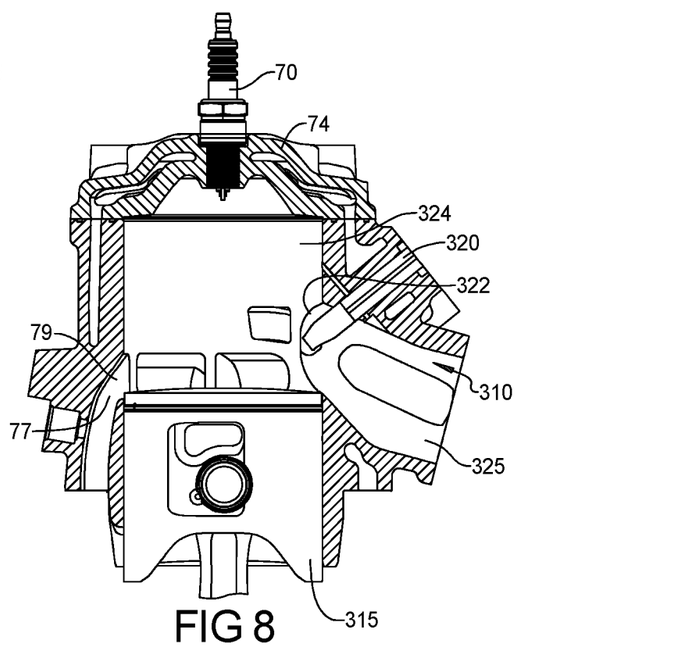
Figures 9, 10:
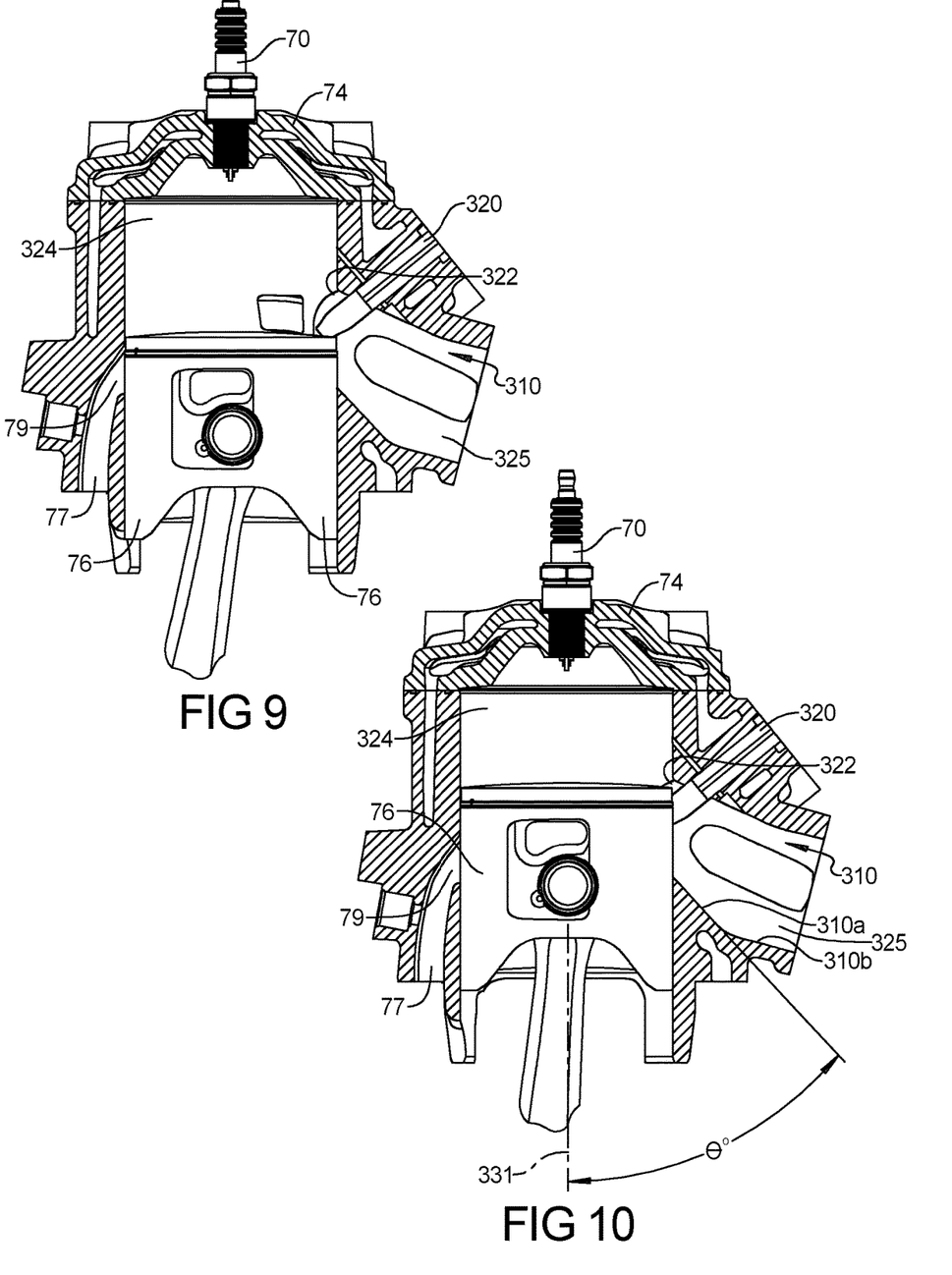

FIG. 5-10 represent the movement of the piston 76 from its top dead center position in FIG. 5 to a compression position in FIG. 10. As is normal in a two stroke engine, at top dead center, compressed fuel air mixture is initiated with a spark, thus driving the piston 76 down. In FIGS. 6 and 7, the piston reaches a point when the piston 67 engages and then passes the exhaust port 310 allowing compressed exhaust gasses to flow through the port 310. In FIG. 7, the piston 76 reaches a fuel/air intake 77 which supplies the fuel/air mixture to the engine for the next engine stroke. The continued movement of the piston down in FIG. 8 draws air and fuel from the fuel/air intake 77 as well as previously expelled exhaust gas and unburned fuel from the exhaust port 310.

In FIGS. 9 and 10, the piston begins to move up toward top dead center placing the piston skirt 315 adjacent to the exhaust port 310. Because the exhaust port 310 has a resonant frequency, a compressed wave of exhaust gas and unburned fuel travels in a direction toward the combustion chamber. At certain engine speeds, this compressed wave of exhaust gas hits the piston skirt 315 before the wave enters the combustion chamber. In this regard, below an engine RPM of about 6500 more than 30% of this compressed wave of exhaust gas hits the skirt 315 before entering the combustion chamber. Above this engine speed, more than 50% and preferably more than 70% of compressed wave of exhaust gas passes into the combustion chamber 324 without impinging on the piston skirt 315.

The exhaust port 310 defines an elongated passage at an angle obtuse relative to a centerline of the combustion chamber 324. The exhaust port 310 that defines the elongated passage 325 includes a first portion 310a that may be at an angle θ between 45 and 60 degrees relative to a centerline 331 of the piston travel that directs flow of exhaust gasses away from the cylinder head 74. The exhaust port 310 may further include a second portion 310b. The transfer port 79 fluidly coupled to the fuel/air cylinder intake 77, said transfer port 79 having a fuel injector configured to provide fuel into the transfer port 79. The exhaust port 310 has an exhaust port valve 320 which is actuatable to change an exhaust port aperture size.

Figure 11:
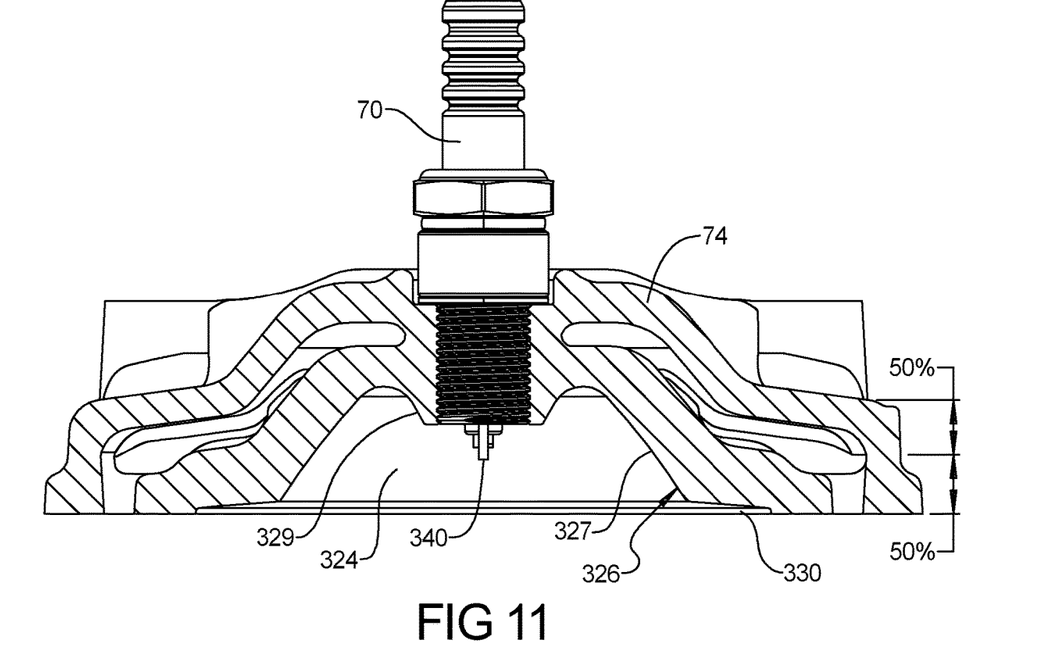
FIG. 11 represents a cross section of the head shown in FIGS. 5-10.
Figure 12:
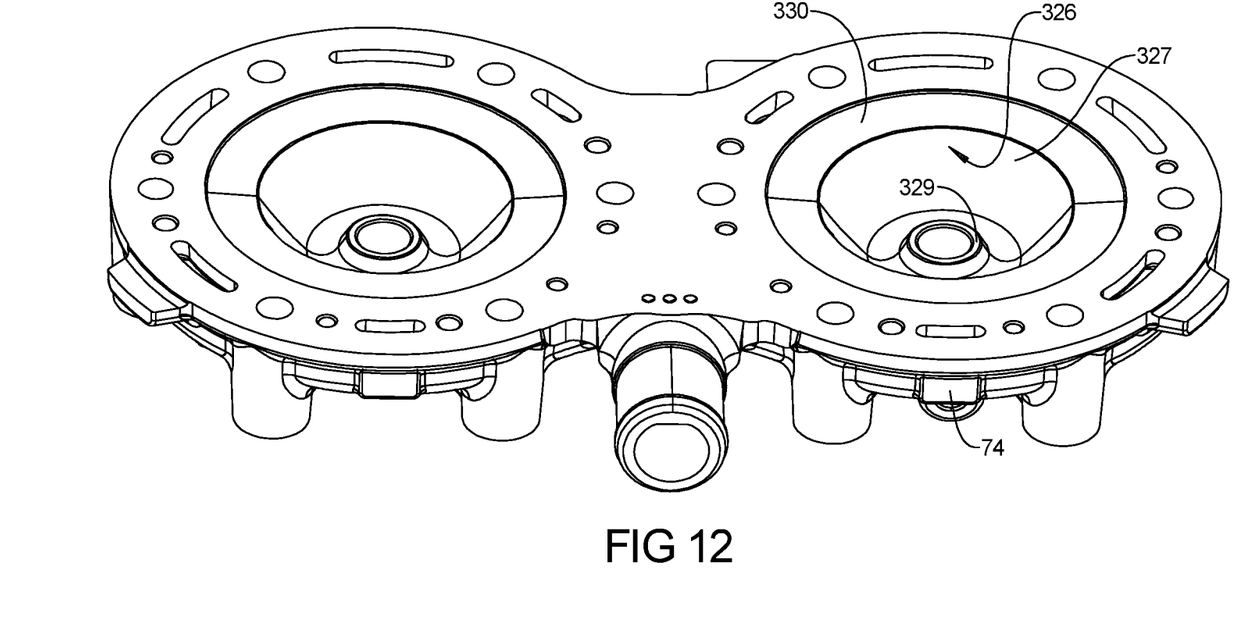
FIG. 12 represents a perspective view of the head shown in FIGS. 5-11.

FIG. 11 represents a cross section of the head 74 shown in FIGS. 5-10. FIG. 12 represents a perspective view of the head shown in FIGS. 5-11. The engine head 74 has a concave interior surface 326 representing a portion of a cutaway of a horn torus. This surface 326 defines a portion of the combustion chamber 324. The engine Assembly 40 has a sparkplug 70 centrally located in the horn torus which positions a spark initiating member 340 at a position between 35 and 40% of the from the piston 76 to the crown of the head surface.

The concave interior surface 326 (horn torus surface) has squish band surface area 330 which represents less than about 50% of the cylinder bore and preferably 48% of bore area. A major radius of curvature which leads to a second portion 327 having a radius of curvature that together define a portion of the combustion chamber 324. Defined on the concave interior surface 326 is a projected member 329 that is annularly disposed about the spark plug 70. The spark plug 70 is positioned 7.5 mm above piston dome, which can be about 35-45% and preferably 45% of combustion dome height, which represents about 10% of engine stroke.

The surface area of the concave portion represents about 146% of the bore surface area. In this regard, the volume of the concave interior surface 326. The concave region represents about 9.1% of cylinder displacement and the system has a Compression ratio 6.45:1. The smooth contours of the surface 326 allow for improved air fuel mixture within the piston draw down. In this regard, the smooth corners reduce null zones within the fuel/air mixture flow, thus improving combustion chamber efficiency.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A two cycle engine comprising: an engine block defining an exhaust port having an exhaust passage extending along an exhaust axis and a cylinder having a central axis; a head coupled to the engine block; a piston having a skirt, the cylinder, head, and piston defining a combustion chamber, wherein the piston is slidably disposed within the cylinder and configured to oscillate at a plurality of frequencies which are a function of a rate that fuel is being added to the combustion chamber; an exhaust system having a resonant frequency that causes a portion of combusted and uncombusted exhaust gasses to flow from the exhaust system and back into the exhaust port; wherein the exhaust port has a first surface adjacent to the cylinder that forms an angle of between 45 degrees and 60 degrees from the central axis directing exhaust gas away from the head and the exhaust port includes a second surface extending at an angle relative to the first surface, wherein at a plurality of engine speeds below a predetermined engine speed, more than 50% of the combusted and uncombusted exhaust gasses flow from the exhaust port back onto the piston skirt and into the combustion chamber, and wherein at a speed above the predetermined speed, more than 70% of the combusted and uncombusted exhaust gasses flow from the exhaust port back into the combustion chamber without substantially engaging the skirt of the piston.

2. The engine according to claim 1 wherein the exhaust port includes an exhaust valve which selectively changes an exhaust port aperture size as a function of the engine speed.

3. The engine according to claim 2 wherein the exhaust system has a resonant frequency that depends on the exhaust port aperture size.

4. The engine according to claim 2 wherein the exhaust port is an elongated passage fluidly coupled to the combustion chamber, the elongated fluid passage being angled in a direction away from the engine head.

5. The engine according to claim 1 wherein the engine head has a surface representing a portion of a cutaway of a horn torus which defines a portion of the combustion chamber.

6. The engine according to claim 1 wherein the head of the engine has a surface representing a cutaway of a torus which defines a portion of the combustion chamber and the engine further has a sparkplug which positions a spark initiating member centrally within the cutaway of the torus.

7. The engine according to claim 1 wherein the head has a surface representing a cutaway of a torus has a combustion dome diameter that at mid height is between 50 and 60% of bore diameter.

8. The engine according to claim 1 wherein the head defines a portion of the combustion chamber and the engine further has a sparkplug which linearly positions a spark initiating member between 35% and 45% from a crown of the head height from the piston surface at top dead center.

9. The engine according to claim 1 wherein the head of the engine has a surface representing a cutaway of a torus of the head defines a volume of greater than 8.5% percent of the combustion chamber volume when the piston is at bottom dead center.

10. An engine comprising:
an engine block, a cylinder having a central axis and, a piston having a piston skirt, and an engine head defining a combustion chamber, defined within the cylinder wall is an exhaust port having an exhaust passage defined by a first exhaust port portion adjacent to the cylinder angled at between 45 degrees and 60 degrees relative to the central axis, and an exhaust system having a resonant frequency that causes a portion of combusted and uncombusted exhaust gasses to flow from the exhaust system back through the exhaust port and into the combustion chamber, wherein at a plurality of engine speeds below an engine speed of 6500 RPM, a majority of the portion of the combusted and uncombusted exhaust gasses flowing from the exhaust port back into the combustion chamber impinges on to the piston skirt, and at a speed above the 6500 RPM, more than 60% of the combusted and uncombusted exhaust gasses flow from the exhaust port and back into the combustion chamber without engaging the skirt of the piston.

11. The engine according to claim 10 further comprising a transfer port fluidly coupled to a cylinder intake port, said transfer port having a fuel injector configured to provide fuel into the transfer port.

12. The engine according to claim 10 wherein the exhaust port comprises an exhaust port valve.

13. The engine according to claim 11 wherein the exhaust port valve is actuatable to change an exhaust port aperture size.

14. The engine according to claim 12 wherein the exhaust system resonant frequency changes from a first frequency to a second frequency upon the actuation of the exhaust port valve.

15. An engine comprising: an engine block, a cylinder wall, a piston having a piston skirt, and an engine head defining a combustion chamber, the engine head defining a concave horn torus surface which defines a portion of the combustion chamber; a spark plug disposed at a central location in the horn torus surface; and an exhaust system having an exhaust port and a resonant frequency that causes a portion of combusted and uncombusted exhaust gasses to flow from the exhaust system and back into the exhaust port; wherein the exhaust port has a first surface adjacent to the cylinder wall that forms an angle of between 45 degrees and 60 degrees from a central axis directing exhaust gas away from the engine head and the exhaust port includes a second surface extending at an angle relative to the first surface, wherein at a plurality of engine speeds below a predetermined engine speed more than 50% of the combusted and uncombusted exhaust gasses flow from the exhaust port back onto the piston skirt and into the combustion chamber, and wherein at a speed above the predetermined speed, more than 70% of the combusted and uncombusted exhaust gasses flow from the exhaust port back into the combustion chamber without substantially engaging the skirt of the piston.

16. The engine according to claim 15 further comprising a transfer port fluidly coupled to a cylinder intake port, said transfer port having a fuel injector configured to provide fuel into the transfer port.

17. The engine according to claim 14 wherein the concave horn torus surface has a major radius of curvature about 24% of a piston dome radius and is 250% of a cylinder bore radius.

18. The engine according to claim 14 wherein the concave horn torus surface of the head defines a volume of greater than 9% of the combustion chamber volume when the piston is at top dead center.

19. The engine according to claim 14 wherein the concave horn torus surface defines a volume of 9 percent of the combustion chamber volume when the piston is at bottom dead center.

20. A two cycle engine comprising:

an engine block defining an exhaust port having an exhaust passage extending along an exhaust axis and a cylinder having a central axis;

a head coupled to the engine block;

a piston having a skirt, the cylinder, head, and piston defining a combustion chamber, wherein the piston is slidably disposed within the cylinder and configured oscillate at a plurality of frequencies which are a function of the rate fuel is being added to the combustion chamber;

an exhaust system having a resonant frequency that causes a portion of combusted and uncombusted exhaust gasses to flow from the exhaust system and back into the exhaust port;

wherein the exhaust port has at least a portion of the exhaust axis adjacent to the cylinder define at least in part by a first surface of the exhaust port angled at between about 45 degrees and 60 degrees from the central axis directing exhaust gas away from the head;

wherein at least one of (i) the head has a surface representing a cutaway of a torus that has a combustion dome diameter that at mid height is between 50 and 60% of bore diameter or (ii) the head defines a portion of the combustion chamber and the engine further has a sparkplug which linearly positions a spark initiating member between 35% and 45% from a crown of the head height from the piston surface at top dead center.

* * * * *